US006967807B2

(12) United States Patent
Settje et al.

(10) Patent No.: US 6,967,807 B2
(45) Date of Patent: Nov. 22, 2005

(54) SELECTING PHYSICAL CYLINDERS IN A DISC DRIVE EMPLOYING DISCS WITH PRE-WRITTEN SERVO PATTERNS

(75) Inventors: Chris Thomas Settje, Westminster, CO (US); David Louis Schell, Ft. Collins, CO (US); Daniel Eugene Hobson, Lyons, CO (US); Teck Khoon Lim, Singapore (SG); Patrick TaiHeng Wong, Singapore (SG); Beng Wee Quak, Singapore (SG); Ming Zhong Ding, Singapore (SG); Soon Wah Leow, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 261 days.

(21) Appl. No.: 10/642,909

(22) Filed: Aug. 18, 2003

(65) Prior Publication Data

US 2005/0041321 A1 Feb. 24, 2005

(51) Int. Cl.⁷ .............................................. G11B 5/596
(52) U.S. Cl. .................................................. 360/77.04
(58) Field of Search .............................. 360/77.04, 75, 360/61, 63, 77.02, 77.08, 78.04

(56) References Cited

U.S. PATENT DOCUMENTS

| | | | |
|---|---|---|---|
| 5,570,247 A | 10/1996 | Brown et al. | |
| 5,949,603 A | 9/1999 | Brown et al. | |
| 6,040,955 A | 3/2000 | Brown et al. | |
| 6,611,396 B1 * | 8/2003 | Kermiche et al. | ....... 360/77.04 |

* cited by examiner

*Primary Examiner*—David Hudspeth
*Assistant Examiner*—Mitchell Slavitt
(74) *Attorney, Agent, or Firm*—David K. Lucente; Derek J. Berger

(57) ABSTRACT

An apparatus and method for selecting physical cylinders (cylinders accessible for read/write operations) in a disc drive is provided. The disc drive includes at least one rotatable disc. The disc drive also includes a first head, which is positionable adjacent a first disc surface, and a second head, which is positionable adjacent a second disc surface. The first disc surface has a first plurality of greycode tracks and the second disc surface has a second plurality of greycode tracks. Each greycode track of the second plurality of greycode tracks corresponds to a different greycode track of the first plurality of greycode tracks, thereby forming a plurality of greycode cylinders, with each greycode cylinder of the plurality of greycode cylinders including a pair of corresponding greycode tracks. The physical cylinders are a subset (less than all) of the plurality of the greycode cylinders. The method of selecting the physical cylinders includes determining whether the first plurality of greycode tracks or the second plurality of greycode tracks demonstrates greater track eccentricity, to thereby obtain a maximum track eccentricity surface and a corresponding maximum eccentricity head. The maximum track eccentricity surface is one of the first and second disc surfaces and the maximum eccentricity head is a corresponding one of the first and second heads. The maximum eccentricity head is used to locate at least one of the physical cylinders.

42 Claims, 8 Drawing Sheets

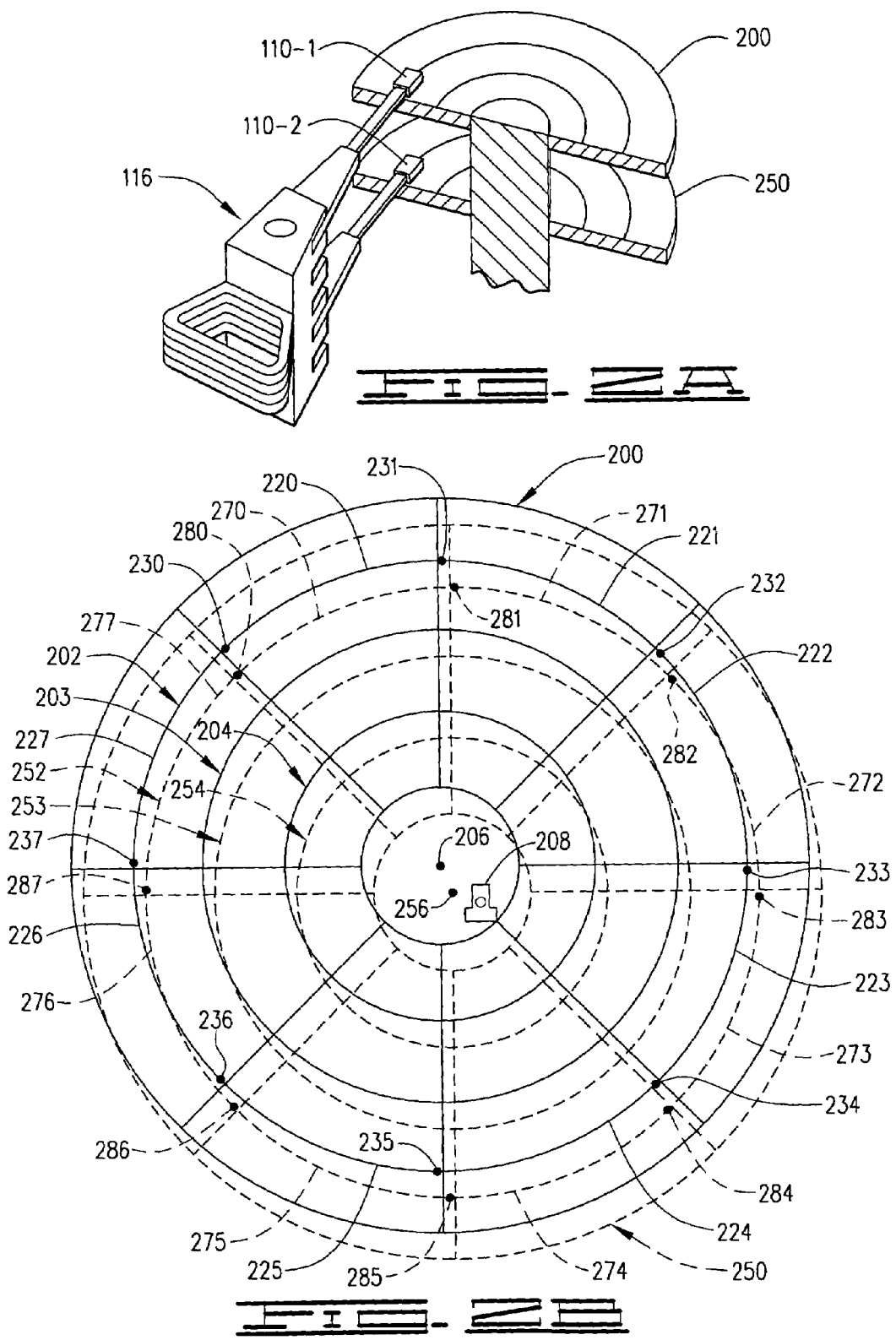

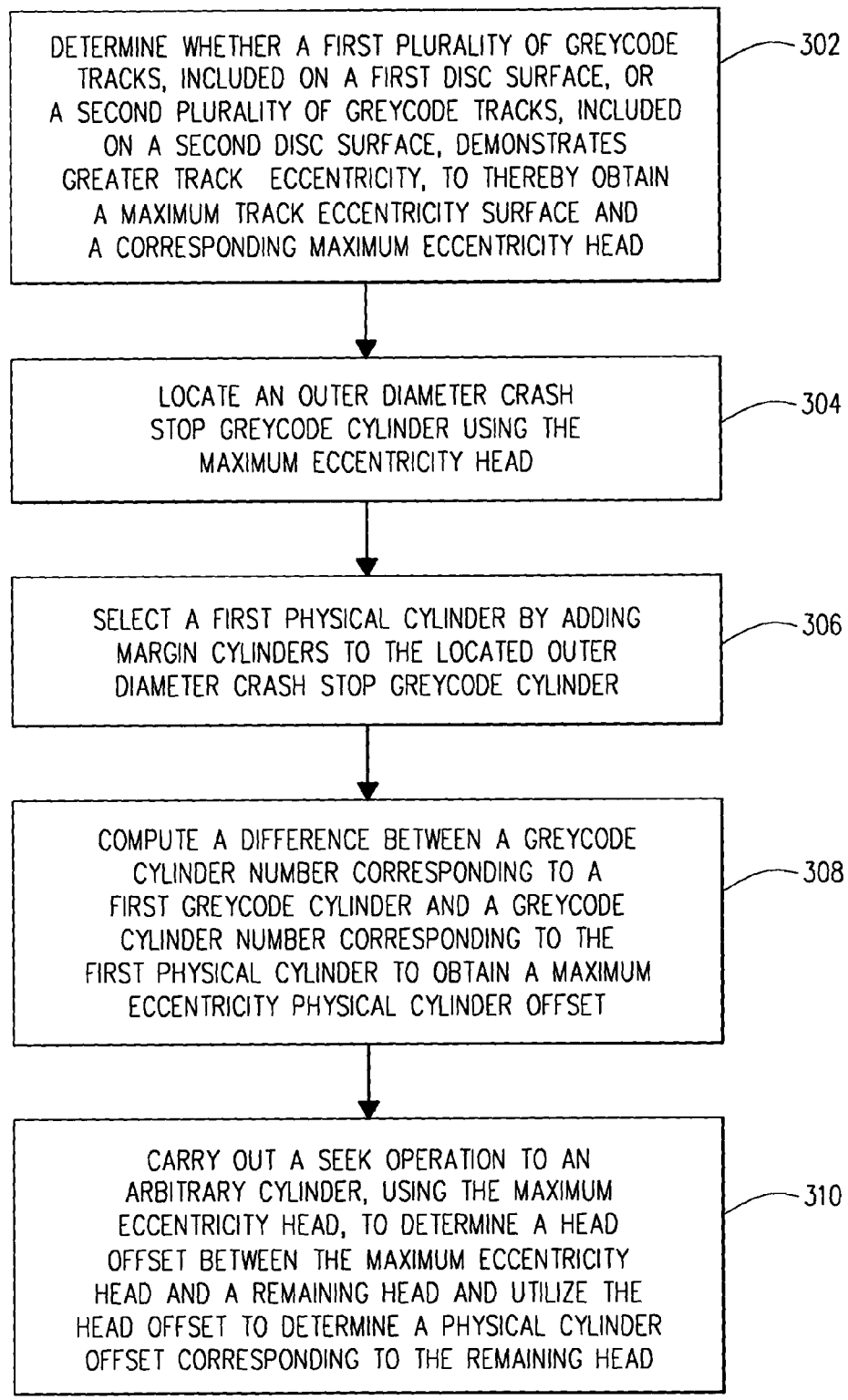
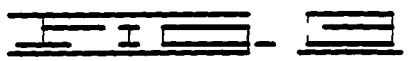

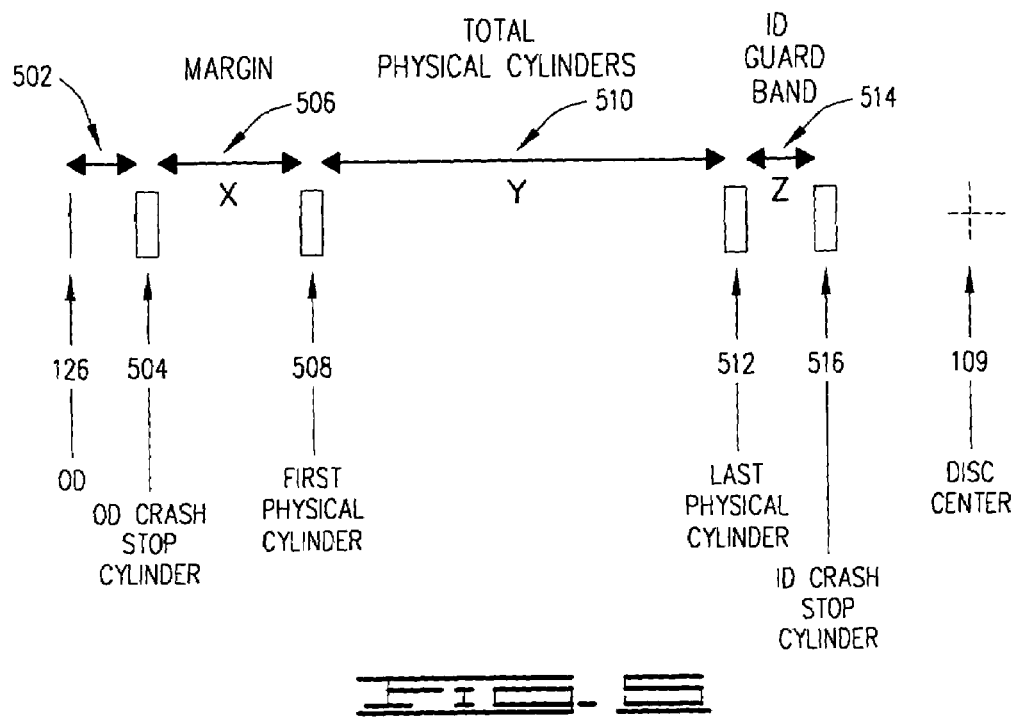
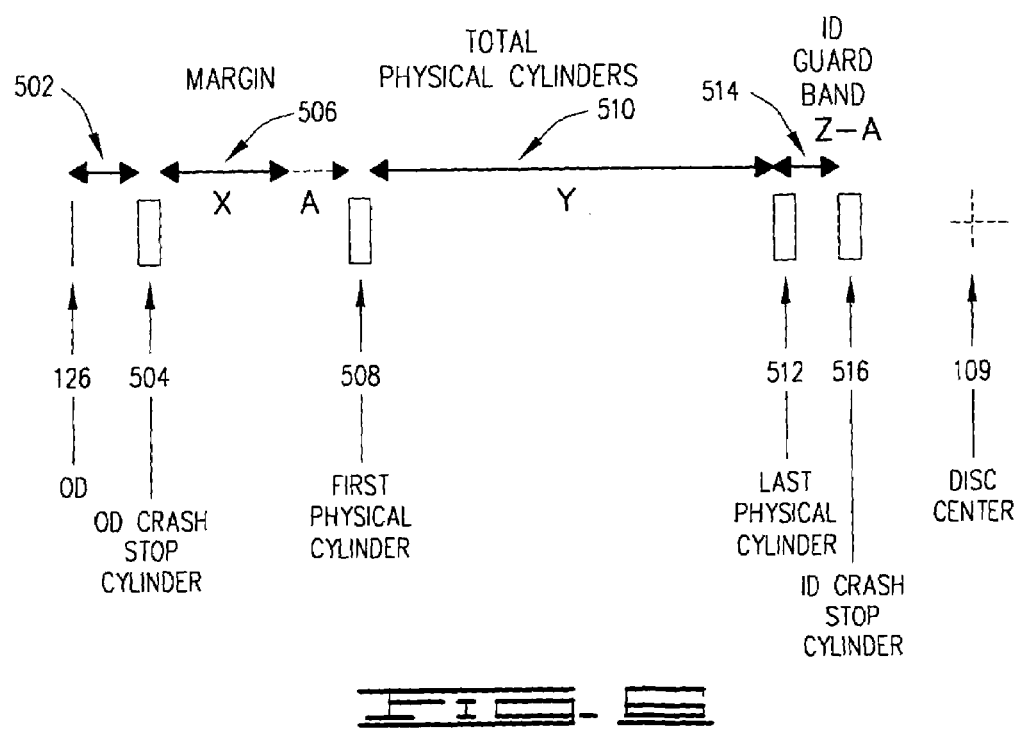

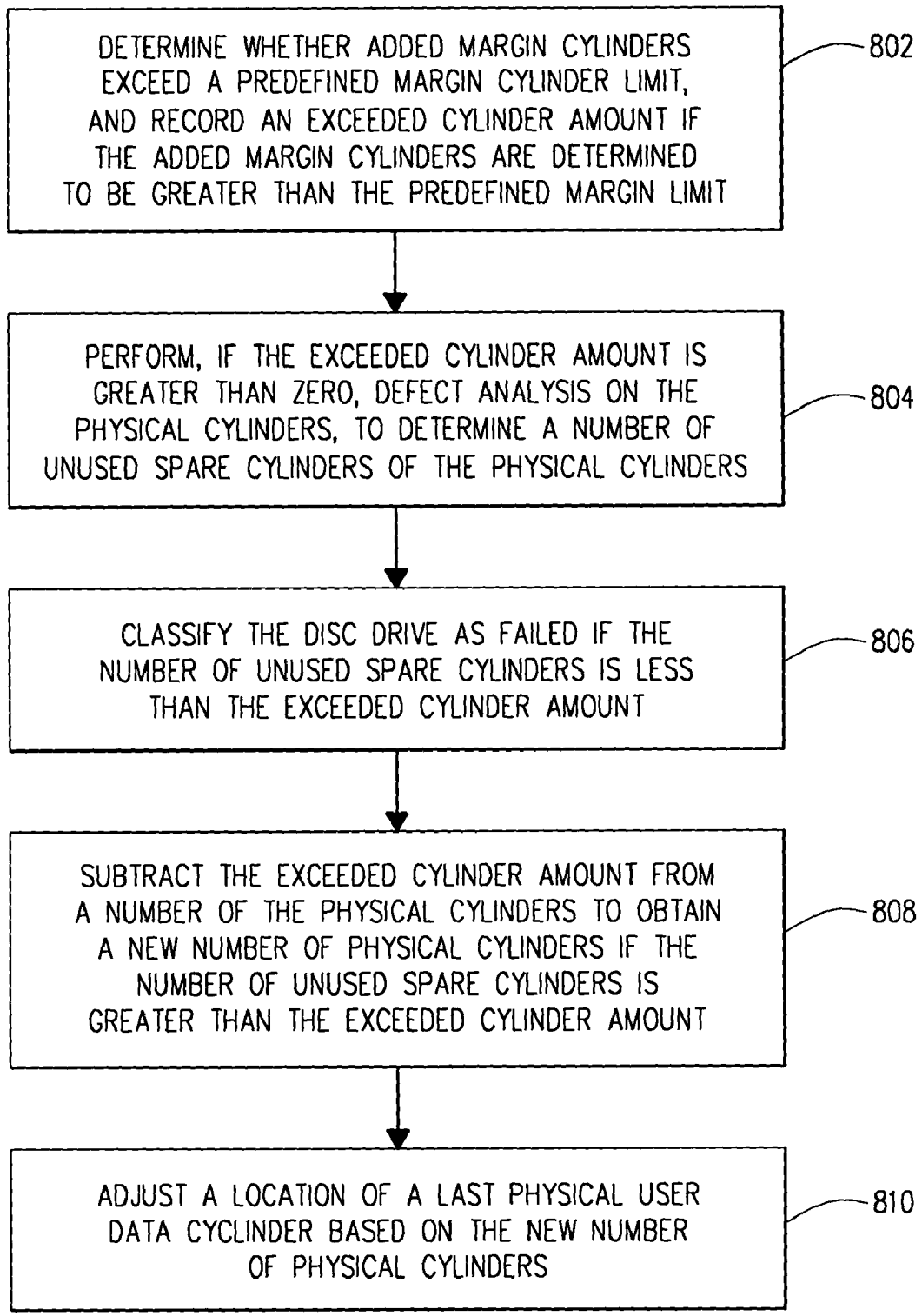
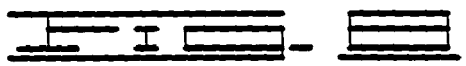

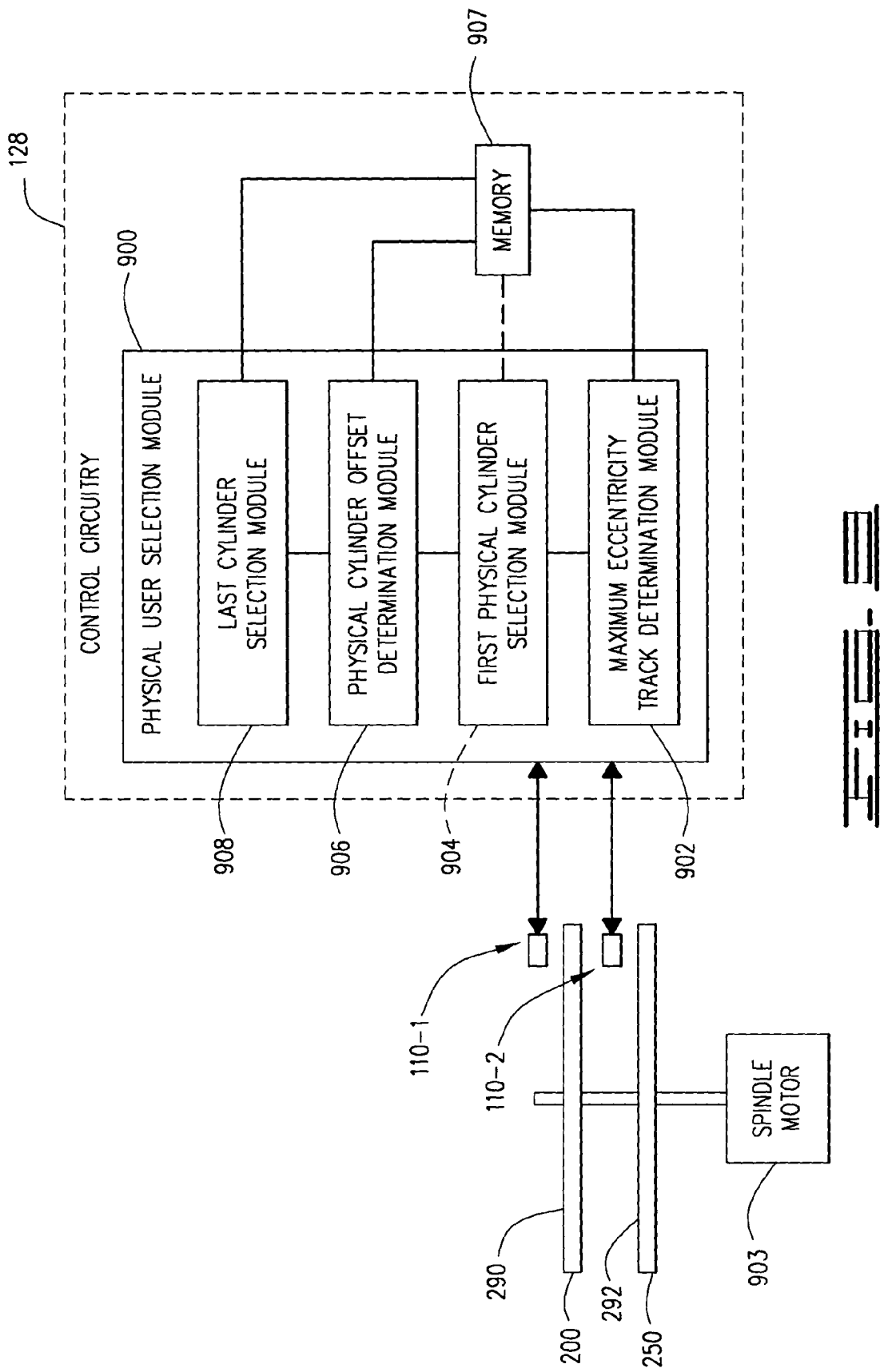

SELECTING PHYSICAL CYLINDERS IN A DISC DRIVE EMPLOYING DISCS WITH PRE-WRITTEN SERVO PATTERNS

FIELD OF THE INVENTION

The present invention relates generally to disc drive data storage systems, and more particularly but not by limitation to disc drives employing discs with pre-written servo patterns.

BACKGROUND OF THE INVENTION

Disc drives are data storage devices that store digital data on a rotating storage medium on a disc. Modern disc drives typically comprise one or more rigid discs that are coated with a magnetizable medium and mounted on the hub of a spindle motor for rotation at a constant high speed. Information is stored on the discs in a plurality of tracks typically by an array of transducers ("heads") mounted to a radial actuator or actuator arm for movement of the heads relative to the discs. Transducers are used to transfer data between a desired track and an external environment. During a write operation, sequential data is written onto the disc track and during a read operation, the head senses the data previously written onto the disc track and transfers the information to the external environment. Important to both of these operations is the accurate and efficient positioning of the head relative to the center of the desired track. Head positioning within a desired track is dependent on head-positioning servo-patterns, i.e., a pattern of data bits used to maintain optimum track spacing and sector timing. Servo-patterns can be recorded between the data sectors on each track of a disc, termed embedded servo, or on one dedicated surface of a disc within the disc drive, termed dedicated servo.

Traditionally, the servo patterns are written onto the disc in-situ (i.e., after the disc is mounted on the spindle motor of a disc drive) when the disc drive is manufactured and are thereafter simply read by the disc drive to determine position.

Recent advances in disc drive manufacturing have created a need for a disc drive with the servo patterns written, or pre-written, to the discs prior to assembly of the disc stack. In particular some manufacturing efficiency has been realized by pre-writing the servo patterns to the disc during the manufacturing of the discs themselves.

Thus, there is a need for minimizing a number of pre-written tracks/cylinders (hereinafter referred to as greycode tracks/cylinders) that are inaccessible to heads of a disc drive, in which pre-written discs are installed, due to problems such as centering misalignment between tracks of the pre-written discs and the disc drive spindle.

SUMMARY OF THE INVENTION

An apparatus and method for selecting physical cylinders (cylinders accessible for read/write operations) in a disc drive is provided. The disc drive includes at least one rotatable disc. The disc drive also includes a first head, which is positionable adjacent a first disc surface, and a second head, which is positionable adjacent a second disc surface. The first disc surface has a first plurality of greycode tracks and the second disc surface has a second plurality of greycode tracks. Each greycode track of the second plurality of greycode tracks corresponds to a different greycode track of the first plurality of greycode tracks, thereby forming a plurality of greycode cylinders, with each greycode cylinder of the plurality of greycode cylinders including a pair of corresponding greycode tracks. The physical cylinders are a subset (less than all) of the plurality of the greycode cylinders. The method of selecting the physical cylinders includes determining whether the first plurality of greycode tracks or the second plurality of greycode tracks demonstrates greater track eccentricity, to thereby obtain a maximum track eccentricity surface and a corresponding maximum eccentricity head. The maximum track eccentricity surface is one of the first and second disc surfaces and the maximum eccentricity head is a corresponding one of the first and second heads. The maximum eccentricity head is used to locate at least one of the physical cylinders.

Other features and benefits that characterize embodiments of the present invention will be apparent upon reading the following detailed description and review of the associated drawings.

BRIEF DESCRIPTION OF THE DRAWINGS

FIG. 2A is a schematic representation of a portion of a disc drive.

FIG. 2B is a top view of the mounted discs of FIG. 2A.

FIG. 3 is a flow chart representing a method of selecting a first physical cylinder in accordance with an embodiment of the present invention.

FIGS. 5 and 6 are simplified block diagrams illustrating the relationship between the inner diameter and outer diameter crash stops and the arrangement of physical cylinders.

FIG. 8 is a flow chart representing a method of selecting a last physical cylinder in an outer diameter crash stop drive.

FIG. 9 is a simplified block diagram of a disc drive including a physical cylinder selection module of the present invention.

DETAILED DESCRIPTION OF ILLUSTRATIVE EMBODIMENTS

Figure 1:
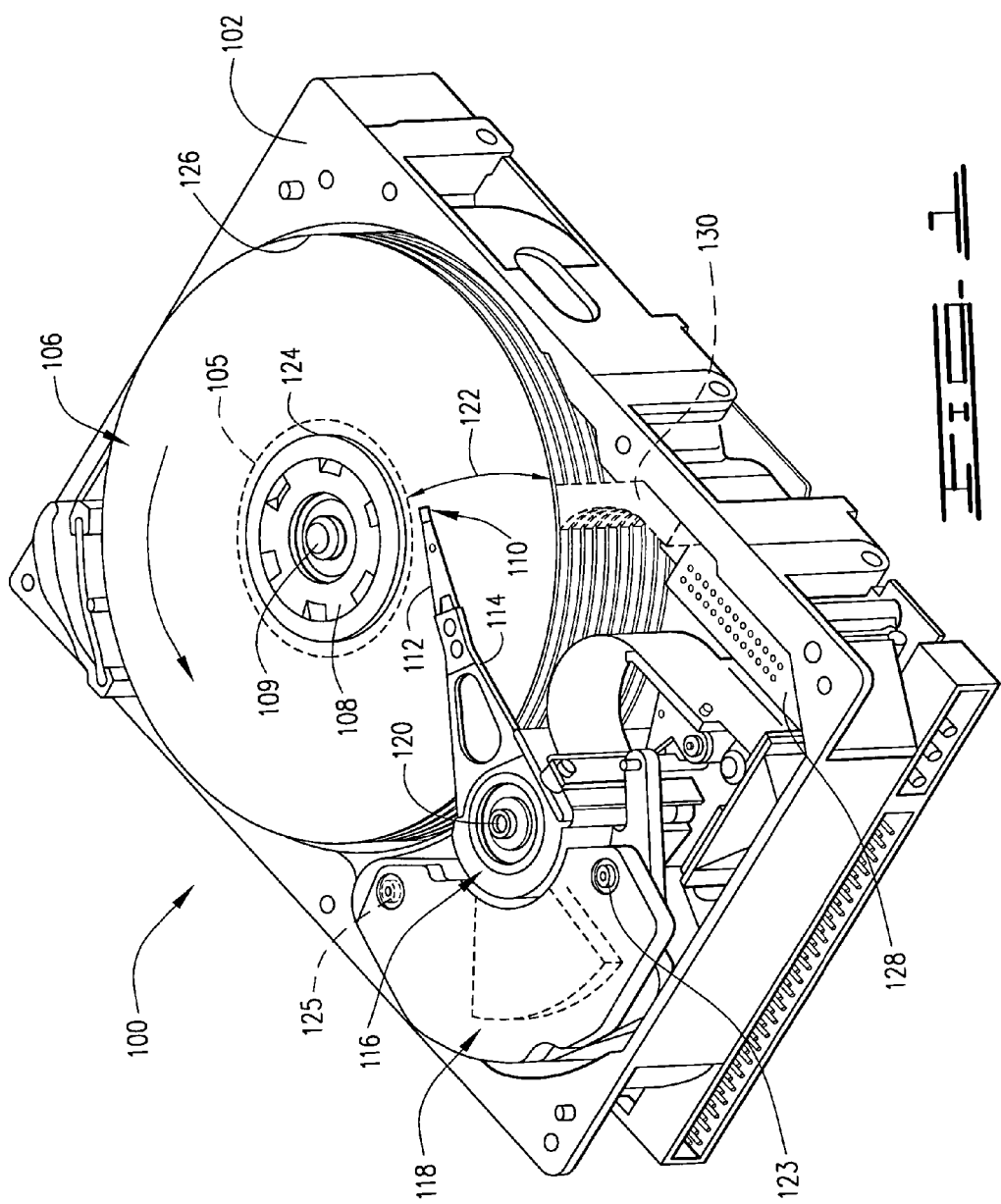
FIG. 1 is an isometric view of a disc drive.

FIG. 1 is an isometric view of a disc drive 100 in which embodiments of the present invention are useful. The same reference numerals are used in the various figures to represent the same or similar elements. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired track along an arcuate path 122 between a disc inner diameter (ID) 124 and a disc outer diameter (OD) 126. Voice coil motor 118 is driven by servo electronics, which is included in control circuitry 128, based on signals generated by heads 110 and a host computer (not shown). In general, circuitry 128, which includes both hardware and software, controls operation of disc drive 100.

An ID crash stop 123, which limits the movement of actuator 116, is included in disc drive 100 to prevent heads 110 from travelling too close to disc clamp 108. In some disc drives, a park surface 105 is included on each disc for parking transducers 110 when the disc drive is de-energized. In such disc drives, an OD crash stop 125 is included to prevent heads 110 from travelling beyond disc OD 126. Such disc drives are hereinafter referred to as OD crash stop drives. In other disc drives, instead of using park surface 105 and OD crash stop 125, an OD ramp 130 is used to facilitate the removal of heads 110 from discs 106 to a parked position adjacent discs 106 when the disc drive is de-energized. Such disc drives are hereinafter referred to as OD ramp load drives.

Referring now to FIG. 2A, a schematic representation of a portion of a disc drive (OD crash stop drive or OD ramp load drive) including pre-written discs 200 and 250 mounted on the hub of a spindle motor is shown. As can be seen in FIG. 2A, a first head 110-1 is positioned over a surface of disc 200 and a second head 110-2 is positioned over a surface of disc 250. Heads 110-1 and 110-2 are supported by actuator 116. Each of heads 110-1 and 110-2 reads both information representative of data as well as information representative of servo or location. Details regarding surfaces of discs 200 and 250 are provided below in connection with FIG. 2B.

FIG. 2B illustrates a diagrammatic top view of discs 200 and 250, with disc 250 represented in dashed lines. A surface of disc 200 includes greycode (or pre-written) tracks such as 202, 203 and 204 and a surface of disc 250 includes greycode tracks such as 252, 253 and 254. Substantially axially aligned greycode tracks on the disc surfaces form a greycode cylinder. Thus, tracks 202 and 252 form a first greycode cylinder, tracks 203 and 253 form a second greycode cylinder and tracks 204 and 254 form a third greycode cylinder. Tracks within the same greycode cylinder are hereinafter referred to as corresponding tracks. The surfaces of discs 200 and 250 also include a plurality of pi-shaped consecutive sectors, numbered 220–227 and 270–277, respectively. The sectors extend radially across the tracks. Head-positioning servo patterns are included at the beginning of each sector of each track (in embedded servo disc drives). For example, track 202 includes servo patterns 230–237 and corresponding track 252 includes servo patterns 280–287. Greycode tracks 202, 203 and 204 have an actual track center shown by reference numeral 206 and greycode tracks 252, 253 and 254 have an actual track center shown by reference numeral 256. In a disc drive with pre-written discs such as 200 and 250, an incongruity between the track centers 206 and 256 and the spindle motor spin axis 208 typically exists. Due to this incongruity or miscentering, the greycode tracks (202, 203, 204 and 252, 253, 254) are eccentric to spin axis 208 of the spindle motor.

In general, even under worst case track miscentering, servo tracks must be present below the heads when the heads are near the disc OD. To guarantee this, incrementing greycode tracks are written beginning nearly at the edge (or OD) of the media. However, in OD crash stop drives, the travel of the actuator is limited by the OD crash stop and therefore greycode tracks that are very near the disc OD may not be accessible for reading/writing data. Thus, only a subset (less than all) of the greycode cylinders serve as physical cylinders (cylinders accessible for read/write operations) in the disc drive. Further, the head stack (actuator with attached heads) of the disc writer used to write the servo patterns on the discs is different from the head stack in the disc drive. This could result in relatively large radial offsets between heads in the drive (OD crash stop drive or OD ramp load drive), which could require non-trivial seeks to a target track during head switch operations.

Figure 4:
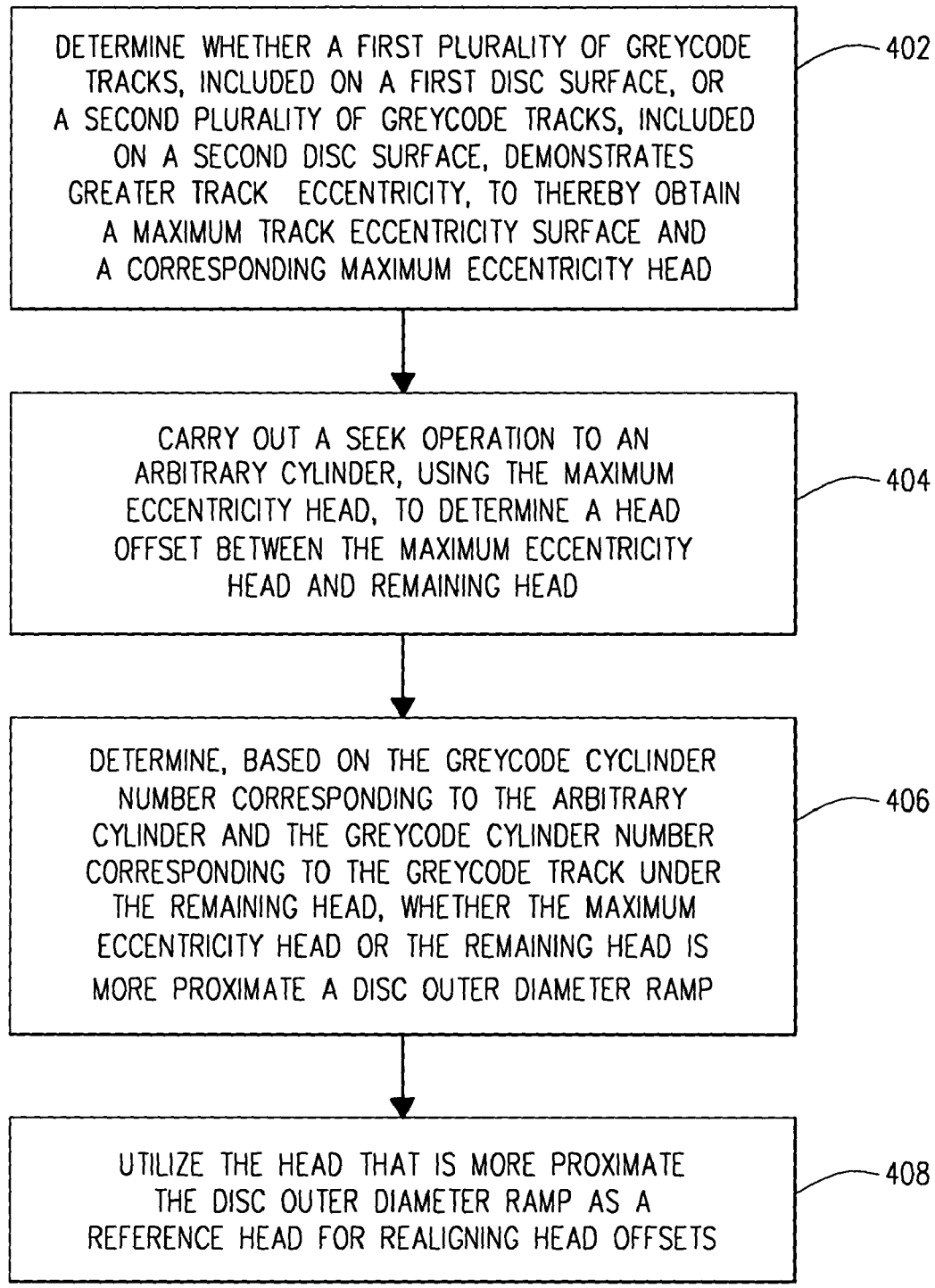
FIG. 4 is a flow chart representing a method of determining head offsets in an outer diameter ramp load drive.

Under the present invention, a technique is provided for selecting physical cylinders from a plurality of greycode cylinders such that a number of greycode cylinders that are inaccessible to the heads is minimized. As part of this technique, offsets between heads of the disc drive are also determined. Details of the physical cylinder selection technique of the present invention are provided below in connection with FIGS. 3–4 and 8–9. FIGS. 3, 4 and 8 are flow charts of methods of selecting physical cylinders and FIG. 9 illustrates a disc drive including a physical cylinder selection module 900, which is configured to carry out the methods of FIGS. 3, 4 and 8. The disc drive of FIG. 9 includes disc surfaces 290 and 292, each of which includes a plurality of greycode tracks. In the disc drive of FIG. 9, energization of spindle motor 903 causes discs 200 and 250, which include surfaces 290 and 292, to rotate. Physical cylinder selection module 900 is a part of disc drive control circuitry 128.

Referring now to FIG. 3, a flow chart representing a method of selecting a first physical cylinder (a physical cylinder that is most proximate the disc outer diameter of the physical cylinders) in an OD crash stop drive having at least one rotatable disc is shown. The disc drive includes a first head, which is positioned over a first disc surface, and a second head, which is positioned over a second disc surface. The first disc surface has a first plurality of greycode tracks and the second disc surface has a second plurality of greycode tracks. Each greycode track of the second plurality of greycode tracks corresponds to a different greycode track of the first plurality of greycode tracks, thus forming a plurality of greycode cylinders. Each greycode cylinder of the plurality of greycode cylinders includes a pair of corresponding greycode tracks. The physical cylinders are a subset (less than all) of the plurality of the greycode cylinders.

At step 302, a determination is made as to whether the first plurality of greycode tracks or the second plurality of greycode tracks demonstrates greater track eccentricity, to thereby obtain a maximum track eccentricity surface and a corresponding maximum eccentricity head. The maximum track eccentricity surface is one of the first and second disc surfaces and the maximum eccentricity head is a corresponding one of the first and second heads. Step 302 is carried out, in some embodiments, by maximum track eccentricity determination module 902 (FIG. 9) of physical cylinder selection module 900 (FIG. 9). Maximum track eccentricity determination module 902 is configured to carry out, in conjunction with other disc drive control circuitry included in controller 128, first and second track following operations to determine the maximum eccentricity surface and the maximum eccentricity head. The first track following operation is carried out using head 110-1 on a first track on disc surface 290. The second track following operation is carried out using head 110-2 on a second track on disc surface 292. A track, of the first and second tracks, for which higher amplitude control signals are required during the track following operation(s) is selected as a maximum eccentricity track by module 902. The surface including the maximum eccentricity track is the maximum eccentricity surface and the head that communicates with the maximum eccentricity surface is the maximum eccentricity head.

At step 304, a seek operation is carried out, using the maximum eccentricity head, in a direction of the disc outer diameter. The seek continues until an outer diameter crash stop is encountered, to thereby locate an outer diameter crash stop greycode cylinder of the plurality of greycode cylinders. Step 304 is carried out, in some embodiments, by first cylinder selection module 904 (FIG. 9) of physical cylinder selection module 900 (FIG. 9). Upon receipt of a maximum eccentricity head number from module 902, module 904 carries out a seek operation, using the maximum eccentricity head, in a direction of the disc outer diameter. A position error signal (PES) integrator (not shown), which is also employed in conventional disc drives, acts as a detector to measure forces acting on the actuator. Therefore, as the actuator seeks into the OD crash stop, a force against the actuator, created due to contact between the actuator and the crash stop, can be measured by the PES integrator. Module 904 receives the measured force value from the PES integrator. When the measured force value goes above a predetermined threshold, module 904 determines that the OD crash stop is encountered. The greycode cylinder under the maximum eccentricity head, when the OD crash stop is encountered, is the OD crash stop greycode cylinder. In some embodiments, the OD crash stop greycode cylinder is found by forcing the maximum eccentricity head to the OD crash stop with a fixed force (bias current) and then determining the greycode cylinder under the maximum eccentricity head.

At step 306, a first physical cylinder is selected by adding margin cylinders to the located outer diameter crash stop greycode cylinder in a direction away from the disc outer diameter. Step 306 is also carried out, in some embodiments, by first physical cylinder selection module 904 (FIG. 9) which, upon determining the outer diameter crash stop greycode cylinder, adds margin cylinders to the located outer diameter crash stop greycode cylinder to determine a first physical cylinder. The margin cylinders are added to account for seek overshoot and any other mechanical variations that may occur over the life of the drive.

At step 308, a difference between a greycode cylinder number corresponding to a first greycode cylinder and a greycode cylinder number corresponding to the first physical cylinder is computed to obtain a maximum eccentricity physical cylinder offset. The first greycode cylinder is most proximate the disc outer diameter of the plurality of greycode cylinders. Step 308 is carried out, in some embodiments, by physical cylinder offset determination module 906. Module 906, upon receipt of a greycode cylinder number corresponding to the first physical cylinder from module 904, carries out the above computation. Note that the greycode cylinder number corresponding to the first greycode cylinder may be previously stored in non-volatile memory 907, or on a disc surface 290, 292 and can be accessed by module 906 to compute the maximum eccentricity physical cylinder offset.

At step 310, a seek is performed, using the maximum eccentricity head, to an arbitrary cylinder of the plurality of greycode cylinders. The arbitrary cylinder is either the first physical cylinder or a greycode cylinder less proximate the disc outer diameter than the first physical cylinder. A difference is computed between a greycode cylinder number corresponding to the arbitrary cylinder and a greycode cylinder number corresponding to a greycode track under a remaining head, when the maximum eccentricity head is over a greycode track of the arbitrary cylinder, to obtain a head offset. The remaining head is one of the first and second heads other than the maximum eccentricity head. The head offset is added to the maximum eccentricity physical cylinder offset to obtain a physical cylinder offset corresponding to the remaining head. The maximum eccentricity physical cylinder offset and the physical cylinder offset corresponding to the remaining head are stored for use during normal operation of the disc drive. Step 310, is also carried out, in some embodiments, by physical cylinder offset determination module 906. To ensure that accurate greycode numbers are read, in some embodiments, module 906 reads greycode cylinder numbers for a greycode track/cylinder (such as the arbitrary cylinder or the track under the remaining head) at each servo sector and averages the readings obtained. In other embodiments, instead of calculating the head offset at each servo sector, the computations are carried out for a subset (less than all) of the servo sectors. Preferably, the computations are carried out for evenly spread servo sectors. Module 906 performs the computations required according to step 310 and stores the maximum eccentricity physical cylinder offset and the physical cylinder offset corresponding to the remaining head on disc surface 290 and/or disc surface 292, and/or in memory 907.

Referring now to FIG. 4, a flow chart representing a method of determining head offsets in an OD ramp load drive having at least one rotatable disc is shown. As mentioned above, other than the inclusion of an OD parking ramp instead of a park surface and an OD crash stop, OD ramp load drives are substantially similar to OD crash stop drives.

In the flow chart of FIG. 4, step 402 is the same as step 302 (FIG. 3) and is therefore carried out, in some embodiments, by module 902. At step 404, a seek operation is performed, using the maximum eccentricity head, to an arbitrary cylinder of the plurality of greycode cylinders. The arbitrary cylinder is either the first physical cylinder or a greycode cylinder less proximate the disc outer diameter than the first physical cylinder. A difference is computed between a greycode cylinder number corresponding to the arbitrary cylinder and a greycode cylinder number corresponding to a greycode track under a remaining head, when the maximum eccentricity head is over a greycode track of the arbitrary cylinder, to obtain a head offset. The remaining head is one of the first and second heads other than the maximum eccentricity head. At step 406, based on the greycode cylinder number corresponding to the arbitrary cylinder and the greycode cylinder number corresponding to the greycode track under the remaining head, a determination is made as to whether the maximum eccentricity head or the remaining head is more proximate a disc outer diameter ramp. For example, in some embodiments, the greycode cylinder (arbitrary cylinder or cylinder corresponding to the remaining head) with the lower cylinder number is the greycode cylinder more proximate the outer diameter ramp. At step 408, the head that is more proximate the disc outer diameter ramp is selected for utilization as a reference head for adjusting for the head offset during head switch operations. The head offset values are stored for use during normal operation of the disc drive. In a ramp load drive, no selection of a first physical cylinder is carried out and therefore the maximum eccentricity head number is provided directly from maximum track eccentricity determination module 902 to physical cylinder offset determination module 906, which thereafter carries out steps 404, 406 and 408 and stores the head offset values on disc surface 290 and/or disc surface 292, and/or in memory 907.

In some embodiments, the computation of a head offset in an OD ramp load drive that includes first and second heads does not include the determination of a maximum eccentricity head. Instead, one of the first and second heads is selected as a reference head, and a seek operation is carried out to an arbitrary cylinder of the plurality of greycode cylinders. A difference between a greycode cylinder number corresponding to the arbitrary cylinder and a greycode cylinder number corresponding to a greycode track under a remaining head is computed to obtain the head offset. The remaining head is one of the first and second heads other than the reference head.

As mentioned earlier, in OD crash stop drives, margin cylinders are added to the OD crash stop greycode cylinder to determine the location of the first physical cylinder. The number of margin cylinders added is different for each disc drive. This is because different drives have different degrees of track miscentering and other mechanical differences. The location of, and relationship between, the margin cylinders and the physical cylinders are described below in connection with FIGS. 5 and 6.

Referring now to FIG. 5, a simplified block diagram illustrating the relationship between the ID and OD crash stops and the arrangement of physical cylinders is shown. The total number of physical cylinders is usually predefined for a particular type (or model) of disc drive. Further, a certain number of greycode cylinders, proximate the disc ID, are used to form an ID guard band. The ID guard band cylinders remain unused in order to prevent the read/write heads from travelling too close to the disc spindle. This prevents certain undesirable mechanical problems that can arise due to the head stack travelling too close to the drive spindle.

In FIG. 5, region 502 includes greycode cylinders between disc OD 126 and OD crash stop greycode cylinder 504. Region 506 includes margin cylinders between OD crash stop greycode cylinder 504 and first physical cylinder 508. Region 510 represents the physical cylinders which include first physical cylinder 508, last physical cylinder 512, and all greycode cylinders between cylinders 508 and 512. Region 514 is the ID guard band region which includes ID crash stop cylinder 516 and all greycode cylinders between last physical cylinder 512 and ID crash stop cylinder 516.

Let "X" be a maximum number of margin cylinders such that an increase in margin cylinders beyond X will result in the predefined total number of physical cylinders "Y" encroaching into guard band region 514. Let "Z" be a predefined number of ID guard band cylinders. Now referring to FIG. 6, a condition in which an excess of "A" margin cylinders causes a corresponding reduction in ID guard band cylinders to Z−A is shown. Such a situation will result in the read/write heads having to travel too close to the spindle when accessing any one of the greycode cylinders which should have been in the ID guard but are now physical cylinders. In some embodiments of the present invention, the physical cylinder selection process fails, and the disc drive is classified as "failed," when the number of margin cylinders are greater than X.

Figure 7A:
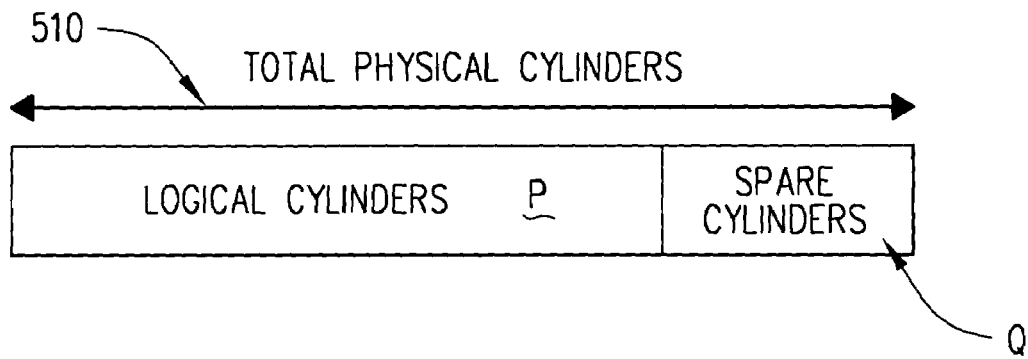
FIGS. 7A and 7B are simplified block diagrams showing contents of a physical cylinder region.
Figure 7B:
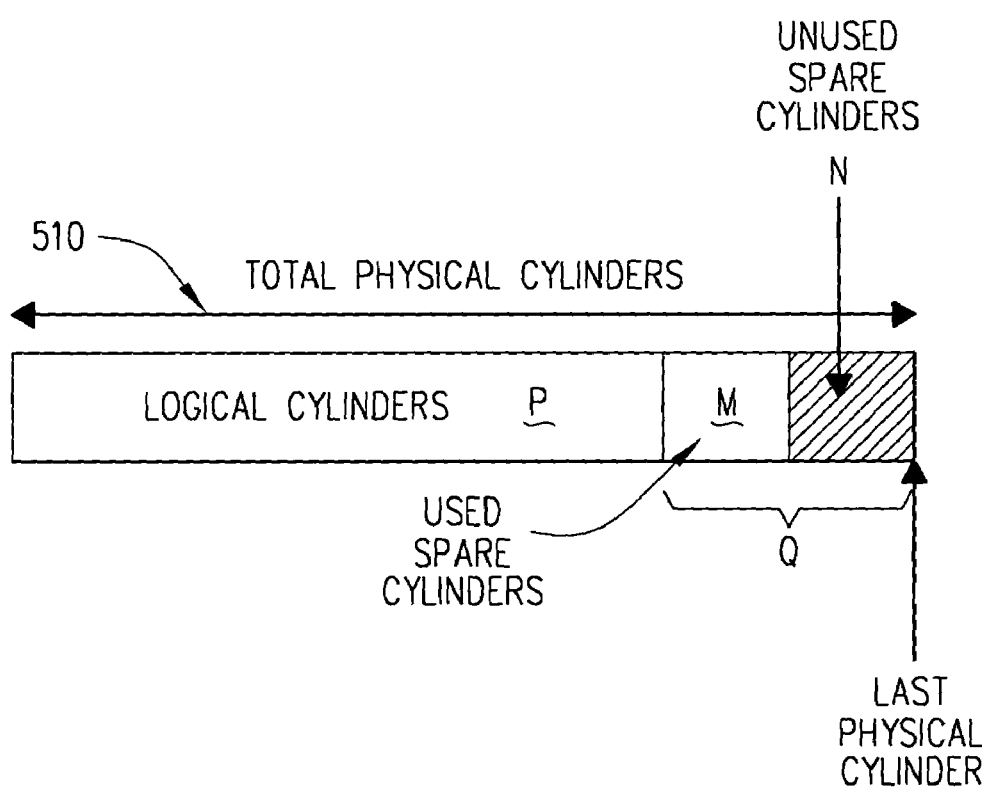

Referring now to FIG. 7A, a simplified block diagram showing contents of physical cylinder region 510 is shown. As can be seen in FIG. 7A, total physical cylinders Y include a number of logical cylinders "P" and a number of spare cylinders "Q". P logical cylinders are a minimum number of non-defective cylinders required for reading/writing data in the disc drive. When defect analysis of the physical cylinders is carried out, a number of used spare cylinders "M" and a number of unused spare cylinders "N" are determined. Used spare cylinders M and unused spare cylinder N are shown in FIG. 7B. From FIG. 7B, it is clear that if the last physical cylinder is moved A cylinders away from the ID, the guard band can be restored to its predefined number of cylinders. However, for the disc drive to operate in accordance with design specifications, the restoration of the guard band to its predefined number of cylinders can be carried out only if A is less than or equal to N. A technique for salvaging a disc drive, which would otherwise be classified as failed due to the number of margin cylinders being greater than X, by restoring the ID guard band to its predefined number of cylinders is described below in connection with FIG. 8

FIG. 8 is a flow chart representing a method of selecting a last physical cylinder in an OD crash stop drive having at least one rotatable disc. At step 802, a determination is made as to whether the added margin cylinders (step 306 (FIG. 3) exceed a predefined margin cylinder limit. An exceeded cylinder amount is recorded if the added margin cylinders are determined to exceed the predefined margin limit. At step 804, if the exceeded cylinder amount is greater than zero, defect analysis of the physical cylinders is carried out to determine a number of unused spare cylinders of the physical cylinders. At step 806, the disc drive is classified as failed if the number of unused spare cylinders is less than the exceeded cylinder amount. At step 808, the exceeded cylinder amount is subtracted from a number of the physical cylinders to obtain a new number of physical cylinders if the number of unused spare cylinders is greater than or equal to the exceeded cylinder amount. At step 810, a location of a last physical cylinder based on the new number of physical cylinders is adjusted. In some embodiments, steps 802–810 are carried out by last physical cylinder selection module 908 (FIG. 9). Module 908 operates in conjunction with other components (not shown) of control circuitry 128 to carry out procedures such as defect mapping of the physical cylinders to determine the number of unused physical cylinders. Further, module 908 includes instructions to carry out the required computations for determining the last physical cylinder. Module 908 stores results such as a last physical cylinder number on disc surface 290 and/or disc surface 292, and/or in memory 907.

From the above embodiments of the present invention, it is clear that several seek operations are carried out to destination cylinders that are specific greycode cylinders. To allow for seeking to a specific greycode cylinder, the following command is employed:

$$Sxxxx,yyyy,zzzz \qquad \text{Formula 1}$$

where S indicates that Formula 1 is a seek command, parameter xxxx is a 16 bit integer that represents cylinder number, parameter yyyy is a 16 bit integer that represents a desired destination head and parameter zzzz is a signed 16 bit integer that represents physical cylinder offset. If bit 10 in parameter yyyy is set, the seek command will seek to the greycode cylinder number specified in parameter xxxx. The seek command of Formula 1 is used for carrying out seek operations during the physical cylinder determination process and also during normal operation of the disc drive.

In FIG. 9, physical cylinder selection module 900 is shown as including separate modules 902–908, each of which carries out a different function. However, in some embodiments of the present invention, physical cylinder selection module 900 is a single module that is capable of carrying out the different functions of modules 902–908. As mentioned above, the physical cylinder offset values are stored on disc surface 290 and/or disc surface 292, and/or in memory 907. During disc drive operation, the addition of offset values is carried out by servo code included in disc controller 128. Specifically, a physical cylinder number is passed to a servo seek routine (which includes Formula 1, for example), and an offset value is added to this cylinder number on a per head basis.

Although the above-described embodiments of the present invention are directed to selecting physical cylinders in a disc drive including a first disc surface and a second disc surface, the teachings of the present invention can be applied to drives including any number of discs, heads and disc surfaces.

In some embodiments of the present invention, the disc drive only consists of a signal head such as 110-1 (FIG. 2A) that communicates with a single disc such as 200 (FIG. 2A). In such embodiments, instead of locating physical cylinders, physical tracks are located from greycode tracks such as 202, 203, 204, etc. Therefore, using the single head, a first physical track, last physical track, outer diameter crash stop greycode track, number of unused spare tracks of the physical tracks, new number of physical tracks, etc., are obtained. In these embodiments, since only a single head is utilized, a maximum eccentricity head need not be determined. In other respects, the selection of physical tracks in a disc drive having a single head is carried out in a manner that is substantially similar to the embodiments described above that include multiple heads.

In some embodiments that relate to disc drives employing multiple heads, instead of selecting a maximum eccentricity head, an arbitrary reference head is selected and, using the reference head, the physical cylinders are determined.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive data storage system while maintaining substantially the same functionality without departing from the scope and spirit of the present invention. In addition, although the preferred embodiment described herein is directed to selecting greycode cylinders of pre-written discs mounted in a disc drive for use as physical cylinders, it will be appreciated by those skilled in the art that the teachings of the present invention can also be applied when misalignment between the spin axis and the track centers occurs in a disc drive with in-situ written discs (due to shock, for example), without departing from the scope and spirit of the present invention. Further, the physical cylinder selection scheme may be implemented in hardware or software. The disc drive can be based upon magnetic, optical, or other storage technologies and may or may not employ a flying slider.

What is claimed is:

1. A method of selecting physical cylinders in a disc drive having at least one rotatable disc, the disc drive including a first head, which is positionable adjacent a first disc surface, and a second head, which is positionable adjacent a second disc surface, the first disc surface having a first plurality of greycode tracks and the second disc surface having a second plurality of greycode tracks, with each greycode track of the second plurality of greycode tracks corresponding to a different greycode track of the first plurality of greycode tracks, thereby forming a plurality of greycode cylinders, wherein each greycode cylinder of the plurality of greycode cylinders comprising a pair of corresponding greycode tracks, and wherein the physical cylinders are a subset of the plurality of the greycode cylinders, the method comprising:

(a) determining whether the first plurality of greycode tracks or the second plurality of greycode tracks demonstrates greater track eccentricity, to thereby obtain a maximum track eccentricity surface and a corresponding maximum eccentricity head, the maximum track eccentricity surface being one of the first and second disc surfaces and the maximum eccentricity head being a corresponding one of the first and second heads; and (b) utilizing the maximum eccentricity head to locate at least one of the physical cylinders.

2. The method of claim 1 wherein the utilizing step (b) further comprises selecting, using the maximum eccentricity head, a greycode cylinder of the plurality of greycode cylinders, for use as a first physical cylinder, the first physical cylinder being most proximate a disc outer diameter of the physical cylinders.

3. The method of claim 2 wherein selecting, using the maximum eccentricity head, the greycode cylinder of the plurality of greycode cylinders, for use as the first physical cylinder further comprises seeking, using the maximum eccentricity head, in a direction of the disc outer diameter until an outer diameter crash stop is encountered, to thereby locate an outer diameter crash stop greycode cylinder of the plurality of greycode cylinders, and utilizing the outer diameter crash stop greycode cylinder to select the first physical cylinder.

4. The method of claim 3 further comprising selecting the first physical cylinder by adding margin cylinders to the located outer diameter crash stop greycode cylinder in a direction away from the disc outer diameter.

5. The method of claim 4 further comprising computing a difference between a greycode cylinder number corresponding to a first greycode cylinder and a greycode cylinder number corresponding to the first physical cylinder to obtain a maximum eccentricity physical cylinder offset, the first greycode cylinder being most proximate the disc outer diameter of the plurality of greycode cylinders.

6. The method of claim 5 further comprising seeking, using the maximum eccentricity head, an arbitrary cylinder of the plurality of greycode cylinders, the arbitrary cylinder being either a first physical cylinder or a greycode cylinder less proximate the disc outer diameter than the first physical cylinder, and computing a difference between a greycode cylinder number corresponding to the arbitrary cylinder and a greycode cylinder number corresponding to a greycode track under a remaining head, when the maximum eccentricity head is over a greycode track of the arbitrary cylinder, to obtain a head offset, the remaining head being one of the first and second heads other than the maximum eccentricity head.

7. The method of claim 6 further comprising adding the head offset to the maximum eccentricity physical cylinder offset to obtain a physical cylinder offset corresponding to the remaining head.

8. The method of claim 7 further comprising storing the maximum eccentricity physical cylinder offset and the physical cylinder offset corresponding to the remaining head.

9. The method of claim 1 wherein the utilizing step (b) further comprises seeking, using the maximum eccentricity head, an arbitrary cylinder of the plurality of greycode cylinders, the arbitrary cylinder being either a first physical cylinder or a greycode cylinder less proximate the disc outer diameter than the first physical cylinder, and computing a difference between a greycode cylinder number corresponding to the arbitrary cylinder and a greycode cylinder number corresponding to a greycode track under a remaining head, when the maximum eccentricity head is over a greycode track of the arbitrary cylinder, to obtain a head offset, the remaining head being one of the first and second heads other than the maximum eccentricity head.

10. The method of claim 9 further comprising determining, based on the greycode cylinder number corresponding to the arbitrary cylinder and the greycode cylinder number corresponding to the greycode track under the remaining head, whether the maximum eccentricity head or the remaining head is more proximate a disc outer diameter ramp.

11. The method of claim 10 further comprising selecting the head that is more proximate the disc outer diameter ramp for use as a reference head for adjusting for the head offset during head switch operations.

12. The method of claim 4 further comprising determining whether the added margin cylinders exceed a predefined margin cylinder limit, and recording an exceeded cylinder amount if the added margin cylinders are determined to exceed the predefined margin limit.

13. The method of claim 12 further comprising performing, if the exceeded cylinder amount is greater than zero, defect analysis of the physical cylinders to determine a number of unused spare cylinders of the physical cylinders.

14. The method of claim 13 further comprising classifying the disc drive as failed if the number of unused spare cylinders is less than the exceeded cylinder amount.

15. The method of claim 13 further comprising subtracting the exceed cylinder amount from a number of the physical cylinders to obtain a new number of physical cylinders if the number of unused spare cylinders is greater than or equal to the exceeded cylinder amount.

16. The method of claim 15 further comprising adjusting a location of a last physical cylinder based on the new number of physical cylinders.

17. A disc drive comprising:
at least one rotatable disc;
a first head positionable adjacent a first disc surface, the first disc surface having a first plurality of greycode tracks;
a second head positionable adjacent a second disc surface, the second disc surface having a second plurality of greycode tracks, with each greycode track of the second plurality of greycode tracks corresponding to a different greycode track of the first plurality of greycode tracks, thereby forming a plurality of greycode cylinders, wherein each greycode cylinder of the plurality of greycode cylinders comprising a pair of corresponding greycode tracks; and
a physical cylinder selection module configured to select physical cylinders from the plurality of greycode cylinders by:
(a) determining whether the first plurality of greycode tracks or the second plurality of greycode tracks demonstrates greater track eccentricity, to thereby obtain a maximum track eccentricity surface and a corresponding maximum eccentricity head, the maximum track eccentricity surface being one of the first and second disc surfaces and the maximum eccentricity head being a corresponding one of the first and second heads; and
(b) utilizing the maximum eccentricity head to locate at least one of the physical cylinders.

18. The apparatus of claim 17 wherein the physical cylinder selection module is further configured to carry out the utilizing step (b) by selecting, using the maximum eccentricity head, a greycode cylinder of the plurality of greycode cylinders, for use as a first physical cylinder, the first physical cylinder being most proximate a disc outer diameter of the physical cylinders.

19. The apparatus of claim 18 wherein the physical cylinder selection module is further configured to select, using the maximum eccentricity head, the greycode cylinder of the plurality of greycode cylinders, for use as the first physical cylinder by seeking, using the maximum eccentricity head, in a direction of the disc outer diameter until an outer diameter crash stop is encountered, to thereby locate an outer diameter crash stop greycode cylinder of the plurality of greycode cylinders, and utilizing the outer diameter crash stop greycode cylinder to select the first physical cylinder.

20. The apparatus of claim 19 wherein the physical cylinder selection module is further configured to select the first physical cylinder by adding margin cylinders to the located outer diameter crash stop greycode cylinder in a direction away from the disc outer diameter.

21. The apparatus of claim 20 wherein the physical cylinder selection module is further configured to compute a difference between a greycode cylinder number corresponding to a first greycode cylinder and a greycode cylinder number corresponding to the first physical cylinder to obtain a maximum eccentricity physical cylinder offset, the first greycode cylinder being most proximate the disc outer diameter of the plurality of greycode cylinders.

22. The apparatus of claim 21 wherein the physical cylinder selection module is further configured to seek, using the maximum eccentricity head, an arbitrary cylinder of the plurality of greycode cylinders, the arbitrary cylinder being either the first physical cylinder or a greycode cylinder less proximate the disc outer diameter than the first physical cylinder, and to compute a difference between a greycode cylinder number corresponding to the arbitrary cylinder and a greycode cylinder number corresponding to a greycode track under a remaining head, when the maximum eccentricity head is over a greycode track of the arbitrary cylinder, to obtain a head offset, the remaining head being one of the first and second heads other than the maximum eccentricity head.

23. The apparatus of claim 22 wherein the physical cylinder selection module is further configured to add the head offset to the maximum eccentricity physical cylinder offset to obtain a physical cylinder offset corresponding to the remaining head.

24. The apparatus of claim 23 wherein the physical cylinder selection module is further configured to store the maximum eccentricity physical cylinder offset and the physical cylinder offset corresponding to the remaining head.

25. The apparatus of claim 17 wherein the physical cylinder selection module is further configured to carry out the utilizing step (b) by seeking, using the maximum eccentricity head, an arbitrary cylinder of the plurality of greycode cylinders, the arbitrary cylinder being either the first physical cylinder or a greycode cylinder less proximate the disc outer diameter than the first physical cylinder, and computing a difference between a greycode cylinder number corresponding to the arbitrary cylinder and a greycode cylinder number corresponding to a greycode track under a remaining head, when the maximum eccentricity head is over a greycode track of the arbitrary cylinder, to obtain a head offset, the remaining head being one of the first and second heads other than the maximum eccentricity head.

26. The apparatus of claim 25 wherein the physical cylinder selection module is further configured to determine, based on the greycode cylinder number corresponding to the arbitrary cylinder and the greycode cylinder number corresponding to the greycode track under the remaining head, whether the maximum eccentricity head or the remaining head is more proximate a disc outer diameter ramp.

27. The apparatus of claim 26 wherein the physical cylinder selection module is further configured to select the head that is more proximate the disc outer diameter ramp for use as a reference head for adjusting for the head offset during head switch operations.

28. The apparatus of claim 20 wherein the physical cylinder selection module is further configured to determine whether the added margin cylinders exceed a predefined margin cylinder limit, and to record an exceeded cylinder amount if the added margin cylinders are determined to exceed the predefined margin limit.

29. The apparatus of claim 28 wherein the physical cylinder selection module is further configured to perform, if the exceeded cylinder amount is greater than zero, defect analysis on the physical cylinders to determine a number of unused spare cylinders of the physical cylinders.

30. The apparatus of claim 29 wherein the physical cylinder selection module is further configured to classify the disc drive as failed if the number of unused spare cylinders is less than the exceeded cylinder amount.

31. The apparatus of claim 30 wherein the physical cylinder selection module is further configured to subtract the exceed cylinder amount from a number of the physical cylinders to obtain a new number of physical cylinders if the number of unused spare cylinders is greater than or equal to the exceeded cylinder amount.

32. The apparatus of claim 31 wherein the physical cylinder selection module is further configured to adjust a location of a last physical cylinder based on the new number of physical cylinders.

33. A method of selecting physical tracks in a disc drive having a rotatable disc, the disc drive including a head that is positionable adjacent a disc surface, the disc surface having a plurality of greycode tracks from which the physical tracks are selected, the physical tracks are a subset of the greycode tracks, the method comprising:
(a) seeking, using the head, in a direction of a disc outer diameter until an outer diameter crash stop is encountered, to thereby locate an outer diameter crash stop greycode track of the plurality of greycode tracks; and
(b) utilizing the outer diameter crash stop greycode track to select a first physical track, the first physical track being most proximate the disc outer diameter of the physical tracks.

34. The method of claim 33 further comprising selecting the first physical track by adding margin tracks to the located outer diameter crash stop greycode track in a direction away from the disc outer diameter.

35. The method of claim 34 further comprising determining whether the added margin tracks exceed a predefined margin track limit, and recording an exceeded track amount if the added margin tracks are determined to exceed the predefined margin limit.

36. The method of claim 35 further comprising performing, if the exceeded track amount is greater than zero, defect analysis of the physical tracks to determine a number of unused spare tracks of the physical tracks.

37. The method of claim 36 further comprising classifying the disc drive as failed if the number of unused spare tracks is less than the exceeded track amount.

38. The method of claim 36 further comprising subtracting the exceed track amount from a number of the physical tracks to obtain a new number of physical tracks if the number of unused spare tracks is greater than or equal to the exceeded track amount.

39. The method of claim 38 further comprising adjusting a location of a last physical track based on the new number of physical tracks.

40. A method of selecting physical cylinders in a disc drive having at least one rotatable disc, the disc drive including a first head, which is positionable adjacent a first disc surface, and a second head, which is positionable adjacent a second disc surface, the first disc surface having a first plurality of greycode tracks and the second disc surface having a second plurality of greycode tracks, with each greycode track of the second plurality of greycode tracks corresponding to a different greycode track of the first plurality of greycode tracks, thereby forming a plurality of greycode cylinders, wherein each greycode cylinder of the plurality of greycode cylinders comprising a pair of corresponding greycode tracks, and wherein the physical cylinders are a subset of the plurality of the greycode cylinders, the method comprising:
(a) selecting one of the first and second heads as a reference head; and
(b) utilizing the reference head to locate at least one of the physical cylinders.

41. The method of claim 40 wherein the utilizing step (b) further comprises seeking, using the reference head, an arbitrary cylinder of the plurality of greycode cylinders, and computing a difference between a greycode cylinder number corresponding to the arbitrary cylinder and a greycode cylinder number corresponding to a greycode track under a remaining head, when the reference head is over a greycode track of the arbitrary cylinder, to obtain a head offset, the remaining head being one of the first and second heads other than the reference head.

42. A disc drive comprising:
a plurality of greycode cylinders;
means for selecting physical cylinders from the plurality of greycode cylinders.

* * * * *